United States Patent
Hsu et al.

(10) Patent No.: US 8,533,081 B2
(45) Date of Patent: Sep. 10, 2013

(54) SYSTEM AND METHOD FOR DYNAMIC VALUE ADDED ATTRIBUTION

(75) Inventors: Jason Hsu, Pasadena, CA (US); Vitali Kalesnik, Pasadena, CA (US)

(73) Assignee: Research Affiliates, LLC, Newport Beach, CA (US)

( * ) Notice: Subject to any disclaimer, the term of this patent is extended or adjusted under 35 U.S.C. 154(b) by 1032 days.

(21) Appl. No.: 12/256,778

(22) Filed: Oct. 23, 2008

(65) Prior Publication Data

US 2009/0119228 A1 May 7, 2009

Related U.S. Application Data

(60) Provisional application No. 60/981,953, filed on Oct. 23, 2007.

(51) Int. Cl.
G06Q 40/00 (2012.01)

(52) U.S. Cl.
USPC .............................................. 705/35; 705/36

(58) Field of Classification Search
USPC .......................................................... 705/36
See application file for complete search history.

(56) References Cited

U.S. PATENT DOCUMENTS

2006/0106570 A1* 5/2006 Feldman ...................... 702/179
2008/0010181 A1* 1/2008 Infanger ..................... 705/36 R
2008/0109377 A1* 5/2008 Haig ........................... 705/36 R

OTHER PUBLICATIONS

CFA Institute, "Managing Investment Portfolios A Dynamic Process Third Edition", John Wiley & Sons, Mar. 2007.*
ScienceDirect, "Hedge fund portfolio construction: A comparison of static and dynamic approaches", Journal of Banking & Finance, Jul. 2006.*
CFA Publications, "Managing Investment Portfolios A Dynamic Process Third Edition", CFA Publications, Mar. 2007.*
"Cap-Weighted Portfolios Are Sub-Optimal Portfolios," Jason C. Hsu, Journal of Investment Management, vol. 4, No. 3, (2006), pp. 1-10.
"What Cost "Noise"?," Arnott, Financial Analysts Journal, (2005), pp. 10-14.
"Disentangling Size and Value," Robert D. Arnott, Financial Analysts Journal, (2005), pp. 12- 15.
Hsu, Jason C.; Kalesnik, Vitali; and Myers, Brett W.; "Performance Attribution: Measuring Dynamic Allocation Skill," *Financial Analysts Journal*, Nov./Dec. 2010.
Bacon, Carl. 2002. "Excess Returns—Arithmetic or Geometric?" *Journal of Performance Measurement*, vol. 6, No. 3 (Spring):23-31.

(Continued)

*Primary Examiner* — Rajesh Khattar
*Assistant Examiner* — Arunava Chakravarti
(74) *Attorney, Agent, or Firm* — ATFirm PLLC; Ralph P. Albrecht

(57) ABSTRACT

A system, method and computer program product provides for portfolio analysis in one or more exemplary periods. The method may includes determining weight and return measures between a plurality of assets based upon the likely performance of the assets. The method may also includes determining at least one allocation measure (AM) of the plurality of assets, and decomposing the at least one allocation measure (AM) respectively into at least one static allocation (SA) measure and at least one dynamic allocation (DA) measure. The method may also include determining at least one variance measure (VM); and decomposing the at least one variance measure (VM) into at least one static variance (SV) measure and at least one dynamic variance (DV) measure. The measure may also include attributing performance of the active portfolio of the at least one active portfolio manager across the SA, DA, SV and DV.

15 Claims, 8 Drawing Sheets

| Exemplary Year 1 | Portfolio | | Benchmark | |
|---|---|---|---|---|
| | Weight (Wp) | Return (Rp) | Weight (Wb) | Return (Rb) |
| Value | 80.00% | 6.80% | 50.00% | 7.00% |
| Growth | 20.00% | 2.20% | 50.00% | 2.50% |
| Total: | 100.00% | 5.88% | 100.00% | 4.75% |

102   104   106   108   110

(56) References Cited

OTHER PUBLICATIONS

Black, Fischer, and Robert Litterman. 1992. "Global Portfolio Optimization." *Financial Analysts Journal*, vol. 48, No. 5 (September/October):28-43.

Brinson, Gary P., and Nimrod Fachler. 1985. "Measuring Non-U.S. Equity Portfolio Performance." *Journal of Portfolio Management*, vol. 11, No. 3 (Spring):73-76.

Brinson, Gary P., L. Randolph Hood, and Gilbert L. Beebower. 1995. "Determinants of Portfolio Performance." *Financial Analysts Journal*, vol. 51, No. 1 (January/February):133-138.

Carino, David. 1999. "Combining Attribution Effects over Time." *Journal of Performance Measurement*, vol. 3, No. 4 (Summer):5-14.

Daniel, Kent, Mark Grinblatt, Sheridan Titman, and Russ Wermers. 1997. "Measuring Mutual Fund Performance with Characteristic-Based Benchmarks." *Journal of Finance*, vol. 52, No. 3 (July):1035-1058.

Davies, Owen, and Damien Laker. 2001. "Multiple-Period Performance Attribution Using the Brinson Model." *Journal of Performance Measurement*, vol. 6, No. 1 (Fall):12-22.

Fabozzi, Frank J., and Harry M. Markowitz. 2002. The Theory and Practice of Investment Management. New York: John Willey & Sons.

Fama, Eugene F., and Kenneth R. French. 1992. "The Cross-Section of Expected Stock Returns." *Journal of Finance*, vol. 47, No. 2 (June):427-465.

1993. "Common Risk Factors in the Returns on Stocks and Bonds," Journal of Financial Economics, vol. 33, No. 1 (February):3-56.

Grinblatt, Mark, and Sheridan Titman. 1993. "Performance Measurement without Benchmarks: An Examination of Mutual Fund Returns." *Journal of Business*, vol. 66, No. 1 (January):47-68.

Laker, Damien. 2005. "Toward Consensus on Multiple-Period Arithmetic Attribution." *Journal of Performance Measurement*, vol. 9, No. 3 (Spring):26-37.

Menchero, Jose G. 2000. "An Optimized Approach to Linking Attribution Effects over Time." *Journal of Performance Measurement*, vol. 5, No. 1 (Fall):36-42.

2000/2001. "A Fully Geometric Approach to Performance . Attribution." *Journal of Performance Measurement*, vol. 5, No. 2 (Winter):22-30.

2004. "Multiperiod Arithmetic Attribution." *Financial Analysts Journal*, vol. 60, No. 4 (July/August):76-91.

\* cited by examiner

| Exemplary Year 1 | Portfolio | | Benchmark | |
|---|---|---|---|---|
| | Weight (Wp) | Return (Rp) | Weight (Wb) | Return (Rb) |
| Value | 80.00% | 6.80% | 50.00% | 7.00% |
| Growth | 20.00% | 2.20% | 50.00% | 2.50% |
| Total: | 100.00% | 5.88% | 100.00% | 4.75% |
| 102 | 104 | 106 | 108 | 110 |

FIG. 1A

| Allocation | Selection-1 | Selection-2 (Interaction) | Total Selection | Sum |
|---|---|---|---|---|
| (Wp-Wb)Rb | Wb(Rp-Rb) | (Wp-Wb)(Rp-Rb) | Wp(Rp-Rb) | |
| 2.10% | -0.10% | -0.06% | -0.16% | |
| -0.75% | -0.15% | 0.09% | -0.06% | |
| 1.35% | -0.25% | 0.03% | -0.22% | 1.13% |
| 112 | 114 | 116 | 118 | 120 |

FIG. 1B

| Exemplary Year 2 (A) | Portfolio | | Benchmark | |
|---|---|---|---|---|
| | Weight (Wp) | Return (Rp) | Weight (Wb) | Return (Rb) |
| Value | 30.00% | 3.80% | 50.00% | 4.00% |
| Growth | 70.00% | 5.40% | 50.00% | 5.50% |
| Total: | 100.00% | 4.92% | 100.00% | 4.75% |

| Allocation | Selection-1 | Selection-2 (Interaction) | Total Selection | Sum |
|---|---|---|---|---|
| (Wp-Wb)Rb | Wb(Rp-Rb) | (Wp-Wb)(Rp-Rb) | Wp(Rp-Rb) | |
| -0.80% | -0.10% | 0.04% | -0.06% | |
| 1.10% | -0.05% | -0.02% | -0.07% | |
| 0.30% | -0.15% | 0.02% | -0.13% | 0.17% |

| Exemplary Year 2 (B) | Portfolio | | Benchmark | |
|---|---|---|---|---|
| | Weight (Wp) | Return (Rp) | Weight (Wb) | Return (Rb) |
| Value | 80.00% | 5.25% | 50.00% | 5.36% |
| Growth | 20.00% | 4.15% | 50.00% | 4.36% |
| Total: | 100.00% | 5.03% | 100.00% | 4.86% |

| Allocation | Selection-1 | Selection-2 (Interaction) | Total Selection | Sum |
|---|---|---|---|---|
| (Wp-Wb)Rb | Wb(Rp-Rb) | (Wp-Wb)(Rp-Rb) | Wp(Rp-Rb) | |
| 1.61% | -0.06% | -0.03% | -0.09% | |
| -1.31% | -0.11% | 0.06% | -0.04% | |
| 0.30% | -0.16% | 0.03% | -0.13% | 0.17% |

| Exemplary Averages (Years 1 and 2(A)) | Ave. Portfolio | | Ave. Benchmark | |
|---|---|---|---|---|
| | Mean Weight (Wp) | Mean Return (Rp) | Mean Weight (Wb) | Mean Return (Rb) |
| Value | 55.00% | 5.30% | 50.00% | 5.50% |
| Growth | 45.00% | 3.80% | 50.00% | 4.00% |
| Total: | 100.00% | 4.63% | 100.00% | 4.75% |
| 402 | 404 | 406 | 408 | 410 |

FIG. 4A

| Ave. Allocation | Ave. Selection-1 | Ave. Selection-2 (Interaction) | Ave. Total Selection | Ave. Sum |
|---|---|---|---|---|
| Mean[(Wp-Wb)Rb] | Mean[Wb(Rp-Rb)] | Mean[(Wp-Wb)(Rp-Rb)] | Mean[Wp(Rp-Rb)] | |
| 0.65% | -0.10% | -0.01% | -0.11% | |
| 0.18% | -0.10% | 0.04% | -0.07% | |
| 0.83% | -0.20% | 0.03% | -0.18% | 0.65% |
| 412 | 414 | 416 | 418 | 420 |

FIG. 4B

| Ave. Allocation | Static Allocation | Dynamic Allocation |
|---|---|---|
| Mean[(Wp-Wb)Rb] | Mean[(Wp-Wb)]*Mean[Rb] | Ave. Allocation - Static Allocation |
| 0.65% | 0.28% | 0.38% |
| 0.18% | -0.20% | 0.38% |
| 0.83% | 0.08% | 0.75% |
| 422 | 424 | 426 |

FIG. 4C

| Exemplary Averages (Years 1 and 2(B)) | Ave. Portfolio | | Ave. Benchmark | |
|---|---|---|---|---|
| | Mean Weight (Wp) | Mean Return (Rp) | Mean Weight (Wb) | Mean Return (Rb) |
| Value | 80.00% | 6.03% | 50.00% | 6.18% |
| Growth | 20.00% | 3.18% | 50.00% | 3.43% |
| Total: | 100.00% | 5.46% | 100.00% | 4.81% |

| Ave. Allocation | Ave. Selection-1 | Ave. Selection-2 (Interaction) | Ave. Total Selection | Ave. Sum |
|---|---|---|---|---|
| Mean[(Wp-Wb)Rb] | Mean[Wb(Rp-Rb)] | Mean[(Wp-Wb)(Rp-Rb)] | Mean[Wp(Rp-Rb)] | |
| 1.85% | -0.08% | -0.05% | -0.12% | |
| -1.03% | -0.13% | 0.08% | -0.05% | |
| 0.83% | -0.21% | 0.03% | -0.18% | 0.65% |

| Ave. Allocation | Static Allocation | Dynamic Allocation |
|---|---|---|
| Mean[(Wp-Wb)Rb] | Mean[(Wp-Wb)]*Mean[Rb] | Ave. Allocation - Static Allocation |
| 1.85% | 1.85% | 0.00% |
| -1.03% | -1.03% | 0.00% |
| 0.83% | 0.83% | 0.00% |

| Factor: | E[Wji] | E[Rji] | E[Wjb] | E[Rjb] | Factor allocation E[(Wji-Wjb)Rjb] | Stock selection E[(Wji(Rji-Rjb)] | Factor allocation (normalized) E[(Wji-Wjb)(Rjb-Rb)] | Average factor overweight (Wji-Wjb) | Static factor allocation E(Wji-Wjb)E(Rjb) | Dynamic factor allocation (factor allocation-static factor allocation) |
|---|---|---|---|---|---|---|---|---|---|---|
| 1 top decile | 3.97% | 9.99% | 9.35% | 9.66% | -0.51% | 0.00% | 0.16% | -5.37% | -0.52% | 0.01% |
| 2 top decile | 4.42% | 12.80% | 10.16% | 12.66% | -0.59% | -0.02% | 0.00% | -5.74% | -0.73% | 0.14% |
| 3 top decile | 5.53% | 10.33% | 10.25% | 9.86% | -0.34% | 0.01% | 0.14% | -4.72% | -0.47% | 0.13% |
| 4 top decile | 7.33% | 11.74% | 10.04% | 10.48% | -0.28% | 0.09% | 0.05% | -2.71% | -0.28% | 0.01% |
| 5 top decile | 9.18% | 11.87% | 9.87% | 11.20% | 0.01% | 0.06% | 0.01% | -0.69% | -0.08% | 0.08% |
| 6 top decile | 11.41% | 10.97% | 9.96% | 11.24% | 0.19% | -0.04% | 0.00% | 1.45% | 0.16% | 0.02% |
| 7 top decile | 11.99% | 12.51% | 10.10% | 11.80% | 0.19% | 0.08% | 0.01% | 1.89% | 0.22% | -0.04% |
| 8 top decile | 15.09% | 14.53% | 9.95% | 13.46% | 0.65% | 0.15% | 0.17% | 5.15% | 0.69% | -0.04% |
| 9 top decile | 18.14% | 16.46% | 10.08% | 14.94% | 1.10% | 0.35% | 0.28% | 8.06% | 1.20% | -0.11% |
| 10 top decile | 12.93% | 18.17% | 10.26% | 13.32% | 0.68% | 0.48% | 0.29% | 2.67% | 0.36% | 0.32% |
| Sum: | 100.00% | | 100.00% | | 1.10% | 1.16% | 1.10% | 0.00% | 0.57% | 0.53% |

FIG.6

|  | Weights |  | Equity | Bonds |
|---|---|---|---|---|
| Equity | 50.00% |  | 10.00% | 0.00% |
| Bonds | 50.00% |  | 0.00% | 2.00% |
| 702 | 704 |  | 706 | 708 |

FIG. 7A

|  | Weights |  | Equity | Bonds |
|---|---|---|---|---|
| Equity | 20.00% |  | 10.00% | -5.00% |
| Bonds | 80.00% |  | -5.00% | 5.00% |
| 710 | 712 |  | 714 | 716 |

FIG. 7B

SYSTEM AND METHOD FOR DYNAMIC VALUE ADDED ATTRIBUTION

CROSS-REFERENCE TO RELATED APPLICATIONS

The present application claims the benefit of U.S. Provisional Patent Application No. 60/981,953, entitled "System and Method for Dynamic Value Added Attribution," to Hsu, Jason et al., filed Oct. 23, 2007, which is of common assignee to the present invention, all of whose contents are incorporated herein by reference in their entireties.

BACKGROUND

1. Field

Exemplary embodiments relate generally to portfolio management, and more particularly to value added attribution.

2. Related Art

Portfolio management professions are tasked with the challenges of creating and maintaining portfolios of assets whose returns justify their performance. After the period for performance, portfolio performance may be measured ex post facto as against benchmark measures, to determine the relative rate of return. Performance Attribution refers to the techniques employed by performance analysts to comprehend why and how a portfolio's performance has differed from benchmarks. The term for the difference between the portfolio return and the benchmark return is referred to as the active return, meaning the part of a portfolio's performance arising from the active management of the portfolio.

Differing types of performance attribution provide differing ways of providing and understanding an active return. Under one paradigm for performance attribution, there are two or three different kinds of decisions that the portfolio manager can make in an attempt to produce added value. The first measure may be asset allocation, which refers to the relative ability to allocate weights to differing groups of assets. A second measure may be the stock (or asset) selection, which may refer to the value added by decisions within each sector of the portfolio. Yet a third measure is interaction, which may refer to the value added that is not attributable solely to the asset allocation and stock selection decisions. These three attribution terms, namely asset allocation, stock selection, and interaction, may be deemed to sum exactly to the active return provided.

Unfortunately, while known methods of assessing portfolio management generally account for performance generally, they do not account for the ability of the strategy to dynamically tilt in the direction of better performing assets.

SUMMARY

In an exemplary embodiment a system, method and computer program product are provided for portfolio analysis. The method, to which the system and computer program product correspond, performs portfolio analysis in one or more exemplary periods. It includes determining weight and return measures between a plurality of assets based upon the likely performance of the assets; determining at least one allocation measure (AM) of the plurality of assets; and decomposing the at least one allocation measure (AM) respectively into at least one of a static allocation (SA) measure and a dynamic allocation (DA) measure.

The determining the weight and return measures may include: establishing at least one benchmark weight (Wb) of the plurality of assets and at least one corresponding benchmark return (Rb) of the plurality of assets for at least one of a plurality of exemplary periods; and determining at least one portfolio weight (Wp) of the plurality of assets and at least one corresponding portfolio return (Rp) of the plurality of assets for at least one of the exemplary periods.

In an exemplary embodiment, the at least one allocation measure (AM) is based upon a plurality of allocations (A) each corresponding to at least one of the exemplary periods. In an exemplary embodiment, each allocation (A) equals the quantity (Wp−Wb) multiplied by Rb.

In an exemplary embodiment, further included is at least one selection measure (SeM). In an exemplary embodiment, the selection measure (SeM) includes the quantity (Rp−Rb) multiplied by Wp.

In an exemplary embodiment, the weight and return measures are respectively determined for at least a first exemplary period and a second exemplary period. The allocation measure (AM) may include a mean of the first allocation (A-1) for the first exemplary period and the second allocation (A-2) for the second exemplary period.

In an exemplary embodiment, any one of the following may be determined: (i) a mean (Wb-mean) is determined between the benchmark weight (Wb) of the first exemplary period and the benchmark weight (Wb) of the second exemplary period; (ii) a mean (Wp-mean) is determined between the portfolio weight (Wp) of the first exemplary period and the portfolio weight (Wp) of the second exemplary period; and (iii) a mean (Rb-mean) is determined between the benchmark return (Rb) of the first exemplary period and the benchmark return (Rb) of the second exemplary period.

In an exemplary embodiment, the static allocation (SA) measure includes the product of (Wp-mean−Wb-mean) and Rp-mean. Also, in an exemplary embodiment, the dynamic allocation (DA) measure may include the difference between the allocation measure (AM) and the static allocation (SA) measure.

In an exemplary embodiment, further included are: determining at least one variance measure (VM) for the plurality of assets; and decomposing the variance measure (VM) into a static variance (SV) measure and a dynamic variance (SV) measure.

In an exemplary embodiment, an exemplary portfolio analysis system includes: a processing apparatus for determining weight and return measures between a plurality of assets based upon the likely performance of the assets; a processing apparatus for determining at least one allocation measure (AM) of the plurality of assets for the exemplary periods; and a processing apparatus for decomposing the at least one allocation measure (AM) respectively into at least one of a static allocation (SA) measure and a dynamic allocation (DA) measure.

The processing apparatus for determining the weight and return measures may include: a processing apparatus for establishing at least one benchmark weight (Wb) of the plurality of assets and at least one corresponding benchmark return (Rb) of the plurality of assets for at least one of a plurality of exemplary periods; and a processing apparatus for determining at least one portfolio weight (Wp) of the plurality of assets and at least one corresponding portfolio return (Rp) of the plurality of assets for at least one of the exemplary periods.

In an exemplary embodiment, the at least one allocation measure (AM) is based upon a plurality of allocations (A) each corresponding to at least one of the exemplary periods. In an exemplary embodiment, each allocation (A) equals the quantity (Wp−Wb) multiplied by Rb.

In an exemplary embodiment, further included is at least one selection measure (SeM). In an exemplary embodiment, the selection measure (SeM) equals the quantity (Rp–Rb) multiplied by Wp.

In an exemplary embodiment, the processing apparatus for determining weight and return measures respectively includes determining weight and return measures for at least a first exemplary period and a second exemplary period. In an exemplary embodiment, the allocation measure (AM) includes a mean of the first allocation (A-1) for the first exemplary period and the second allocation (A-2) for the second exemplary period.

In an exemplary embodiment, any one of the following may be provided: a processing apparatus determines a mean (Wb-mean) between the benchmark weight (Wb) of the first exemplary period and the benchmark weight (Wb) of the second exemplary period; a processing apparatus determines a mean (Wp-mean) between the portfolio weight (Wp) of the first exemplary period and the portfolio weight (Wp) of the second exemplary period; and a processing apparatus determines a mean (Rb-mean) between the benchmark return (Rb) of the first exemplary period and the benchmark return (Rb) of the second exemplary period.

In an exemplary embodiment, the static allocation (SA) measure includes the product of (Wp-mean−Wb-mean) and Rp-mean. In an exemplary embodiment, the dynamic allocation (DA) measure includes the difference between the allocation measure (AM) and the static allocation (SA) measure.

In an exemplary embodiment, further included are: a processing apparatus for determining at least one variance measure (VM) for the plurality of assets; and a processing apparatus for decomposing the variance measure (VM) into a static variance (SV) measure and a dynamic variance (SV) measure.

In an exemplary embodiment, a machine-readable medium provides instructions, which when executed by a computing platform, causes the computing platform to perform operations comprising a method for performing portfolio analysis in one or more exemplary periods, the method including: determining weight and return measures between a plurality of assets based upon the likely performance of the assets; determining at least one allocation measure (AM) of the plurality of assets; and decomposing the at least one allocation measure (AM) respectively into at least one of a static allocation (SA) measure and a dynamic allocation (DA) measure.

Further features and advantages of, as well as the structure and operation of, various embodiments, are described in detail below with reference to the accompanying drawings.

BRIEF DESCRIPTION OF THE DRAWINGS

The foregoing and other features and advantages of the invention will be apparent from the following, more particular description of exemplary embodiments of the invention, as illustrated in the accompanying drawings. In the drawings, like reference numbers generally indicate identical, functionally similar, and/or structurally similar elements. The drawing in which an element first appears is indicated by the leftmost digits in the corresponding reference number. A preferred exemplary embodiment is discussed below in the detailed description of the following drawings:

FIGS. 1A and 1B depict an exemplary portfolio and benchmark analysis system for a first period;

FIGS. 2A and 2B depict an exemplary portfolio and benchmark analysis system for a second period;

FIGS. 3A and 3B depict an exemplary portfolio and benchmark analysis system for an alternative second period;

FIGS. 4A, 4B and 4C depict an exemplary portfolio and benchmark analysis system providing mean measures between the first and second periods;

FIGS. 5A, 5B and 5C depict an exemplary portfolio and benchmark analysis system providing mean measures between the first and alternative second periods;

FIG. 6 depicts an exemplary portfolio and benchmark analysis system providing mean measures across multiple bins comprising a portfolio;

FIGS. 7A and 7B depict exemplary variance attribution across differing asset classes.

DETAILED DESCRIPTION OF EMBODIMENTS OF THE EMBODIMENTS

Figure 8:
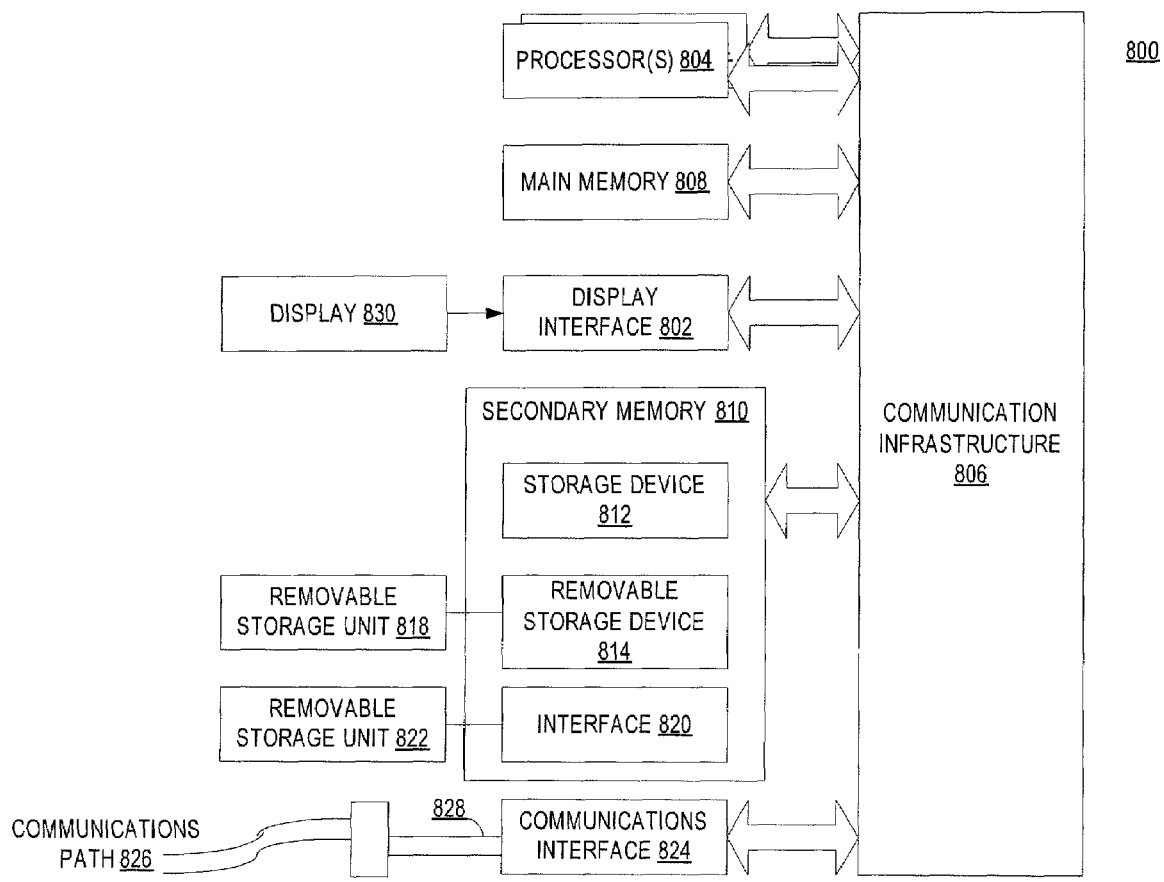
FIG. 8 depicts an exemplary embodiment of a computer system that may be used in association with, in connection with, and/or in place of certain components in accordance with the present embodiments.

Various exemplary embodiments are discussed in detail below including a preferred embodiment. While specific implementations are discussed, it should be understood that this is done for illustration purposes only. A person skilled in the relevant art can recognize that the systems, methods and features provided herein may be used without parting from the spirit and scope of the invention. Furthermore, any and all references cited herein shall be incorporated herein by reference in their respective entireties.

Exemplary Embodiments of Dynamic Value Added Attribution

Value added attribution is a helpful tool used by practitioners to evaluate a strategy or a skill of a portfolio manager. Attribution analysis is a straightforward way of analyzing performance of a particular portfolio relative to some benchmark and allows decomposing relative performance into different effects.

In an exemplary embodiment, one or more variations of attribution systems proposed by Brinson may be employed. FIGS. 1A and 1B depict an exemplary portfolio and benchmark analysis system for a first period. For an exemplary period, which may be any type of period, such as exemplary year 1, portfolio and benchmark values are provided in FIG. 1A. Here, the portfolio manager has divided the total pool of assets into a value class and growth class 102, with weights (Wp) for each of the classes 104, namely weight 80% for the value assets and 20% for the growth assets. As used herein, the assets may be any types of assets associated with an entity, such as stocks, bonds, or any other type of assets.

The relative return 106 (Rp) of the value assets, namely 6.8%, and the relative return 106 (Rp) of the growth assets, namely 2.2%, are determined. These returns are calculated based on the performance of the assets classes in proportion to how heavily these classes are weighted in the portfolio. As shown, the total return on the portfolio is 5.88%.

Since the analysis may be performed after the performance has been completed for the period, or fraction thereof, the portfolio measures may be compared to certain benchmark measures. In particular, in the illustrated embodiment, the benchmark weights (Wb) 108 comprise 50% for the value assets, and 50% for the growth assets. The relative returns 110 (Rp) for these benchmarks, given the weighting performance of the classes of assets, are also provided. In the illustrated example, the benchmark return for value assets is 7%, while it is 2.5% for the growth assets. The total return for the benchmark portfolio is 4.75%. Therefore, the active management of the portfolio, 5.88% has outperformed the benchmark management of the portfolio, 4.75%, by 5.88%−4.75%, or 1.13%.

The analysis may be performed on an asset class level as well. For example, for the value class of assets, the portfolio measure of 6.8% has underperformed the benchmark measure of 7% by 6.8%−7%, or 0.2%. Similarly, for the growth class of assets, the portfolio measure of 2.2% has underperformed the benchmark measure of 2.5% by 2.2%−2.5%, or 0.3%.

It should be noted that the active management of the portfolio as used herein may be provided by a person, one or more processors or any other technology provided herein or capable of being contemplated, or any combination of the latter. Accordingly, as used herein a portfolio manager may be any type of entity and is not limited to a person.

FIG. 1B provides certain measures that may be used to measure the performance of the chosen portfolio as compared to the benchmark measures provided in FIG. 1A. Certain measures that may be used in accordance with the present embodiments include allocation and selection.

Allocation may shows how good the portfolio management strategy is at allocating weights towards the groups of assets likely to outperform. Selection may show how good the strategy is at choosing individual securities within the groups which are likely to outperform.

In a Brinson attribution system as used in accordance with the present embodiments, selection may be provided as Wb(Rp−Rb). An extra component called interaction may be defined as well, which may be defined as Wp(Rp−Rb)−Wb(Rp−Rb). Interaction may show the interaction between the allocation and selection.

The selection or total selection, according to an exemplary embodiments, may be defined as the sum of the aforementioned selection and interaction, namely as Wp(Rp−Rb), i.e., the sum of the classical selection and interaction. In an exemplary embodiment, the sum of all the components may be exactly the value added of the portfolio.

In the illustrated embodiment of FIG. 1B, the performance may be decomposed into: (i) an allocation measure 112 (Wp−Wb)Rb; (ii) a first selection measure 114 of Wb(Rp−Rb); (iii) a second selection measure 116, also called the interaction, of (Wp−Wb)(Rp−Rb); (iv) a total selection measure 118, comprising the total of first selection measure 114 and the interaction measure 116, namely Wp(Rp−Rb); and a sum measure 120.

The sum measure 120 refers to the sum of the allocation measure 112, the first selection measure 114 and the interaction measure 116. The sum measure 120 is illustrated only for the totals of value and growth classes (FIG. 1A), which is 1.13% as above noted. As shown, the 1.13% may be decomposed used the above formulas into an allocation of 1.35%, a first selection measure of −0.25%, and an interaction measure of 0.03%, meaning 1.13%=1.35%−0.25%+0.03%. It should be noted that the first selection measure −0.25% and the interaction measure 0.03% may be added together to yield the total selection measure −0.22%, such that 1.13%=1.35%−0.22%.

As also illustrated, allocation, selection and interaction measures may be calculated for the value class of assets, respectively illustrated as 2.1%, −0.1%, −0.06%, or for the growth class of assets, respectively illustrated as −0.75%, −0.15% and 0.09%. Again, the total selection for each class or group of assets comprises the total of the first selection measure and the interaction measure for each such class or group.

In this particular embodiment, it may be seen that value added to the portfolio comes from aggressive allocation towards value stocks while the overall skill of the portfolio manager in selecting stocks may be quite poor, for example. The question remains whether the strategy employed in this embodiment is a good strategy.

Looking at these numbers alone it may be concluded that the strategy adds most of the illustrated value added by exposing the exemplary portfolio to value which may be commonly believed to outperform growth in the long run. Overall, many portfolios may be considered ways of exposing an investor's investment to portfolio risk factors which historically were known to outperform. For example, with respect to the measure of equity, one example is exposure to such factors as Fama-French factors such as, for example, but not limited to, value or small size stocks.

A valuable investment strategy, according to an exemplary embodiment, may include a strategy not only of giving extra exposure to a factor already known empirically to deliver excess return but also timing this exposure to bring the most value added.

FIGS. 2A and 2B depict an exemplary portfolio and benchmark analysis system for an exemplary second period. For this exemplary period, which may be any type of period, such as exemplary year 2, portfolio and benchmark values are provided in FIG. 2A. Here, the portfolio manager has divided the total pool of assets into a value class and growth class 202, with weights (Wp) for each of the classes 204, namely weight 30% for the value assets and 70% for the growth assets.

The relative return 206 (Rp) of the value assets, namely 3.8%, and the relative return 206 (Rp) of the growth assets, namely 5.4%, are determined. These returns are calculated based on the performance of the assets classes in proportion to how heavily these classes are weighted in the portfolio. As shown, the total return on the portfolio is 4.92%.

In the illustrated embodiment, the benchmark weights (Wb) 208 are the same as in the embodiment of FIG. 1A, namely 50% for the value assets, and 50% for the growth assets. The relative returns 210 (Rp) for these benchmarks in the second period are provided. In the illustrated example, the benchmark return for value assets is 4%, while it is 5.5% for the growth assets. The total return for the benchmark portfolio is the same as in the embodiment of FIG. 1A, namely 4.75%. Therefore, the active management of the portfolio, 4.92% has outperformed the benchmark management of the portfolio, 4.75%, by 4.92%−4.75%, or 0.17%.

On the class level, the analysis provides the following results. For example, for the value class of assets, the portfolio measure of 3.8% has underperformed the benchmark measure of 4% by 3.8%−4%, or 0.2%. Similarly, for the growth class of assets, the portfolio measure of 5.4% has underperformed the benchmark measure of 5.5% by 5.4%−5.5%, or 0.1%.

FIG. 2B provides certain measures that may be used to measure the performance of the chosen portfolio as compared to the benchmark measures provided in FIG. 2A.

In the illustrated embodiment of FIG. 2B, the performance may be decomposed into: (i) an allocation measure 212 (Wp−Wb)Rb; (ii) a first selection measure 214 of Wb(Rp−Rb); (iii) an interaction measure 216 of (Wp−Wb)(Rp−Rb); (iv) a total selection measure 218, comprising the total of first selection measure 214 and the interaction measure 216, namely Wp(Rp−Rb); and a sum measure 220.

The sum measure 220 refers to the sum of the allocation measure 212, the first selection measure 214 and the interaction measure 216. The sum measure 220 is illustrated only for the totals of value and growth classes (FIG. 2A), which is 0.17% as above noted. As shown, the 0.17% may be decomposed used the above formulas into an allocation of 0.3%, a first selection measure of −0.15%, and an interaction measure of 0.02%, meaning 0.17%=0.3%−0.15%+0.02%. Again, the first selection measure −0.15% and the interaction measure 0.02% may be added together to yield the total selection measure −0.13%, such that 0.17%=0.3%−0.13%.

As also illustrated, allocation, selection and interaction measures may be calculated for the value class of assets, respectively illustrated as −0.8%, −0.1%, −0.04%, or for the growth class of assets, respectively illustrated as 1.1%, −0.05% and −0.02%. Again, the total selection for each class or group of assets comprises the total of the first selection measure and the interaction measure for each such class or group.

FIGS. 4A and 4B depict an exemplary portfolio and benchmark analysis system for an average of the exemplary first period (FIG. 1A) and the exemplary second period (FIG. 2A). For this exemplary average, portfolio and benchmark values are provided in FIG. 4A. Here, the portfolio manager has divided the total pool of assets into a value class and growth class 402, with average weights (Wp) for each of the classes 404, namely weight 55% for the value assets and 45% for the growth assets.

The relative average return 406 (Rp) of the value assets, namely 5.3%, and the relative return 406 (Rp) of the growth assets, namely 3.8%, are determined. These average returns are calculated based on the performance of the assets classes in proportion to how heavily these classes are weighted in the portfolio. As shown, the total average return on the portfolio is 4.63%.

In the illustrated embodiment, the average benchmark weights (Wb) 408 are 50% for the value assets, and 50% for the growth assets. The relative average returns 410 (Rp) for these benchmarks in the second period are provided. In the illustrated example, the average benchmark return for value assets is 5.5%, while it is 4% for the growth assets. The total return for the average benchmark portfolio is 4.75%.

FIG. 4B provides certain measures that may be used to measure the performance of the chosen average portfolio as compared to the benchmark measures provided in FIG. 4A.

In the illustrated embodiment of FIG. 4B, the performance may be decomposed into: (i) an average allocation measure 412 Mean[(Wp−Wb)Rb]; (ii) an average first selection measure 414 of Mean[Wb(Rp−Rb)]; (iii) an average interaction measure 416 of Mean[(Wp−Wb)(Rp−Rb)]; (iv) an average total selection measure 418, comprising the total of average first selection measure 414 and the average interaction measure 416, namely Mean[Wp(Rp−Rb)]; and an average sum measure 420.

The average sum measure 420 refers to the sum of the average allocation measure 412, the average first selection measure 414 and the average interaction measure 416. The sum measure 420 is illustrated only for the totals of value and growth classes, which is 0.65%. Consequently, in the illustrated embodiment the value added by active portfolio management comprises 0.65%.

In the exemplary embodiments, there are different ways to aggregate attribution over one or more periods. According to one exemplary embodiment, attribution may be aggregated over several periods by using a simple arithmetic average. In the illustrated embodiment, the average attribution over the two periods is the aforementioned 0.65%, and the average effects over the two periods may be summarized, according to the values provided in FIG. 4B. As shown, the 0.65% may be decomposed used the above formulas into an average allocation of 0.83% and an average total selection of −0.18%. As also illustrated, allocation, selection and interaction measures may be calculated for the value class of assets. Again, the total selection for each class or group of assets comprises the total of the first selection measure and the interaction measure for each such class or group.

According to exemplary embodiments, portfolio analysis may be performed for the same portfolio of the first exemplary period (FIGS. 1A, 1B) for an alternative second exemplary period of FIGS. 3A, 3B. As illustrated, the portfolio chosen for the second period, and shown in FIG. 3A, differs from the above example for FIG. 2A.

However, the value added performance for FIG. 3B is the same as that found in FIG. 2B, at 0.17%. As shown, the allocation measure 312 is the same as the allocation measure 212 of the embodiment of FIG. 2B, namely 0.3%, and the total selection measure 318 is the same as the total selection measure 218 of the latter embodiment, namely −0.13%.

FIGS. 5A and 5B are comparable exemplary averages as between the embodiment for the first exemplary period (FIGS. 1A, 1B) and the embodiment of the alternative second exemplary period (FIGS. 3A, 3B). Therefore, FIGS. 5A, 5B provide the same analysis as provided in the average embodiment of FIGS. 4A, 4B, but between the first exemplary period and the alternative second exemplary period of FIGS. 3A, 3B (instead of the second exemplary period of FIGS. 2A, 2B.)

Again, the average value added performance is the same for FIG. 5B as found in FIG. 4B, at 0.65%. As shown, the average allocation measure 512 of 0.83% of FIG. 5B is identical to the average allocation measure 412 of FIG. 4B. Similarly, the average total selection measure 518 of −0.18 is identical to the average selection measure 418.

In both cases, according to an exemplary embodiment of the present invention, the average value added may be identical and the average attribution may be the same. However, in the first case it is apparent that the strategy was able to properly time the exposure to the changes in the returns while in the second case it came from constantly exposing the portfolio to the small value stocks.

To quantify the ability of a strategy to dynamically tilt in the direction of the better performing group of stocks, a decomposition of the allocation effect into dynamic allocation and static allocation is provided in certain exemplary embodiments.

FIG. 4C provides an exemplary decomposition of the average allocation 422 (same as 412 of FIG. 4B) into static allocation 424 and dynamic allocation 426. According to one exemplary embodiment, the static allocation 424 comprises the product of the mean of (Wp−Wb) and the mean of Rb. In one such exemplary embodiment, the mean values for the latter variables are taken from FIG. 4A. According to one exemplary embodiment, the dynamic allocation 426 comprises the difference between the average allocation 422 and the static allocation 426.

In an exemplary embodiment, FIG. 5C provides an exemplary decomposition of the average allocation 522 (same as 512 of FIG. 5B) into static allocation 524 and dynamic allocation 526. According to one exemplary embodiment, the static allocation 524 comprises the product of the mean of (Wp−Wb) and the mean of Rb. In one such exemplary embodiment, the mean values for the latter variables are taken from FIG. 5A. According to one exemplary embodiment, the dynamic allocation 526 comprises the difference between the average allocation 522 and the static allocation 526.

In the first above noted embodiment of FIG. 4C, the average allocation value of 0.83% is decomposed into 0.08% of static allocation and 0.75% of dynamic allocation. In the second above noted embodiment of FIG. 5C, all of the 0.83% value come from static allocation, and there is no dynamic allocation.

The embodiment of FIG. 6 provides a generalization of the principles of the embodiments of FIGS. 4A-4C and FIGS. 5A-5C. For exemplary equity portfolios this methodology is helpful to characterize a strategy in terms of known sources of return, such as Fama-French factors. In an exemplary embodiment, For instance, the value tilt of a fundamentally weighted portfolio consisting of 1000 stocks versus a capitalization weighted portfolio may be compared. To make a fair comparison, in an exemplary embodiment, the capitalization weighted benchmark may be broken into ten bins (deciles) 602 by descending the price-to-book (P/B) ratio such that the weight in each bin is approximately a 10% weight of the portfolio. From this break down, the P/B ratios on the border of two adjacent bins may be identified and these values may be used as the definition of the bins for the fundamentally weighted index. Using this definition of groups, the attribution analysis described above, according to an exemplary embodiment of the present invention, may be performed.

The embodiment of FIG. 6 serves to summarize and extrapolate from the aforementioned results, according to another exemplary embodiment. Provided for each bin are the mean portfolio weight 604, mean portfolio return 606, mean benchmark weight 608, mean benchmark return 610, average allocation measure (called "factor allocation") 612, total selection measure ("stock selection") 614, normalized average allocation measure 616, average factor overweight 618, as well as static allocation measure 620 and dynamic allocation measure 622.

From FIG. 6, in an exemplary embodiment it is clear that the return increases as the P/B ratio decreases, as can be seen from the mean portfolio return column 606 (E[Rji]) and mean benchmark return column (E[Rjb]). Also in an exemplary embodiment it is clear that the fundamentally weighted index has an obvious value tilt as can be seen from the average factor overweight column 618. In this exemplary embodiment, the average factor allocation is 1.10%, which is almost half of all the value added of the portfolio. The dynamic attribution method, according to an exemplary embodiment, allows for decomposition of this effect into static and dynamic components, as shown in static allocation measure column 620 and dynamic allocation measure column 622. In this exemplary embodiment, only 0.57% of the value added comes from static value tilt. The remainder, 0.53%, comes from dynamic tilt. In other words, the index shifts more weights to value stocks when they are about to outperform and goes more into growth when the value stocks are not so attractive.

In the same or similar manners that value added coming from size tilt may be identified, as provided in the aforementioned embodiments, in other exemplary embodiments, value added coming from allocation to different sectors, as well as, countries and currencies for international portfolios, for example, may be identified.

Exemplary Embodiments of Variance Attribution

In certain embodiments, the attribution model may focus only on the attribution of the mean return and ignore the variance component. However, in certain exemplary embodiments, the variance may also be decomposed in the same or similar fashion.

In an exemplary embodiment useful for illustrative purposes, a fund may invest in equity and/or bonds. The benchmark may have the funds equally split between the two asset classes (equity and bonds) and the funds in the benchmark may have the variance covariance matrix provided in FIG. 7A.

In an exemplary embodiment, it may be supposed the weights do not change over time. Accordingly, the benchmark variance may be 3% or 9% volatility (the standard deviation of the portfolio). To compute the variance, the following formula may be used: $\text{var}(\alpha x + \beta y) = \alpha^2 \text{var}(x) + \beta^2 \text{var}(y) + 2\alpha\beta \text{cov}(x,y)$, where $\alpha$ and $\beta$ are the weights on the equity and the bonds, $\text{var}(x)$ and $\text{var}(y)$ are respectively the variance of equity and bonds, and the term $\text{cov}(x,y)$ is the covariance between them. Because the covariance in the above example is zero, the computation of variance yields $0.5^2 \cdot 0.1 + 0.5^2 \cdot 0.02 = 0.03$.

In an exemplary embodiment, it may be supposed the fund also invests in the same two asset classes and the variance/covariance of the fund's investments is represented with the covariance matrix of FIG. 7B.

Then the variance of the portfolio is 2%. Again the variance is $0.2^2 \cdot 0.1 + 0.8^2 \cdot 0.05 - 2 \cdot 0.8 \cdot 0.2 \cdot 0.05 = 0.02$. Part of the reduction in variance came from the higher allocation to the bonds; however, the composition and the risk characteristics of the fund's performance are totally different. The variance of both the bonds and the equity are higher, and there is a significant covariance term which influences the fund's performance. From the practical perspective it may be determined whether the lower variance of the fund came from the higher allocation to the less risky bonds or from the better composition of the portfolio.

To decompose the variance, the notation is formalized, according to an exemplary embodiment of the present invention. Suppose the fund, whose performance is to be analyzed, has n sectors (or asset classes, or some other classification characteristics based on which the portfolio is to be analyzed). Then let $w_i$ be the weight in the fund to the i-th sector. Let w without the subscript be the n by 1 vector containing all the weights. In the same way, let $\mu$ be the vector of returns on the sectors and let $\Sigma$ be the variance covariance matrix. Let $\tilde{w}$, $\tilde{\mu}$, and $\tilde{\Sigma}$ be the weights' mean return and the variance covariance matrix for the benchmark. In this notation, the mean return of the fund is $w'\mu$ and the variance is $\text{Var}_{Fund} = w'\Sigma w$. For the benchmark, the return is $\tilde{w}'\tilde{\mu}$ and the variance is $\text{Var}_B = \tilde{w}'\tilde{\Sigma}\tilde{w}$. The value added for the portfolio is $w'\mu - \tilde{w}'\tilde{\mu}$, which can be decomposed into sector allocation $(w' - \tilde{w}')\tilde{\mu}$ and stock selection $w'(\mu - \tilde{\mu})$.

In the same way, the dynamic decomposition may be written:

Stock selection: $E[w'(\mu - \tilde{\mu})]$
Total sector allocation: $E[(w' - \tilde{w}')\tilde{\mu}]$
Static sector allocation: $E(w' - \tilde{w}')E(\tilde{\mu})$
Dynamic sector allocation: $E[(w' - \tilde{w}')\tilde{\mu}] - E(w' - \tilde{w}')E(\tilde{\mu})$ or the total sector allocation minus the static sector allocation.

In the same way, the changes in the variance, $w'\Sigma w - \tilde{w}'\tilde{\Sigma}\tilde{w}$, may be decomposed into sector allocation $\text{Var}_{SA} = w'\tilde{\Sigma} w - \tilde{w}'\tilde{\Sigma}\tilde{w} = (w - \tilde{w})'\tilde{\Sigma}(w - \tilde{w})$, which provides the differences in the variances due to the relative weights changes between the fund and the benchmark. Stock selection is $\text{Var}_{SS} = w'(\Sigma - \tilde{\Sigma})w$, which tells how much the variance changed due to the changes in the variance covariance matrix between the fund and the benchmark. It may be noted that $\text{Var}_{Fund} = \text{Var}_B + \text{Var}_{SS} + \text{Var}_{SA}$.

In an exemplary embodiment, the same idea used for breaking the return into static and dynamic components can be applied to the variance. In the dynamic setting, the stock selection of variance is: $E[w'(\Sigma - \tilde{\Sigma})w]$ and the total sector allocation of variance is:

$$E[w'\tilde{\Sigma}w] - E[\tilde{w}'\tilde{\Sigma}\tilde{w}].$$

The static component is:

$$E[w']E[\tilde{\Sigma}]E[w] - E[\tilde{w}']E[\tilde{\Sigma}]E[\tilde{w}].$$

The dynamic component may be the difference between the total sector allocation and the static sector allocation. For the dynamic decomposition to accurately represent the true variance, it may be assumed that there is no conditional heteroscedasticity. In the example introduced above, the difference in variance is 1%. Using the definitions introduced above, the difference in the variance due to sector allocation is −1.32% and the difference due to stock selection is 0.32%. As can be seen, the reduction in the variance may be achieved due to the higher allocation to bonds, which have a lower variance. The composition of portfolio on the other hand increased the variance by 0.32%.

It may be noticed that so far variance has been discussed, not the standard deviation of the portfolio. In the example being considered, the benchmark has 17.3% volatility ($Std_{Fund} = \sqrt{Var_{Fund}}$) and the fund has 14.1% volatility $Std_B = \sqrt{Var_B}$. Standard deviation may be a much more intuitive measure of portfolio's risk as it has the same dimensions as the returns. The decomposition of variance is linear, while to get volatility the square root of the variance may need to be taken, which is not the sum of square roots of its components:

$$Std_{Fund} = \sqrt{Var_{Fund}} = \sqrt{Var_B + Var_{SS} + Var_{SA}} \neq \sqrt{Var_B} + \sqrt{Var_{SS}} + \sqrt{Var_{SA}}$$

One way to compute the measure of the volatility attributed to different factors is as follows:

$$Vol_{SA} = Std_{Fund} - \sqrt{Var_F - Var_{SA}}$$

and:

$$Vol_{SS} = \sqrt{Var_F - Var_{SA}} - \sqrt{Var_F - Var_{SA} - Var_{SS}}$$

A check may be performed:

$$Std_{Fund} = Std_{Fund} + Vol_{SA} + Vol_{SS}.$$

Exemplary Processing and Communications Embodiments

FIG. 8 depicts an exemplary embodiment of a computer system 800 that may be used in association with, in connection with, and/or in place of, but not limited to, any of the foregoing components and/or systems.

The present embodiments (or any part(s) or function(s) thereof) may be implemented using hardware, software, firmware, or a combination thereof and may be implemented in one or more computer systems or other processing systems. In fact, in one exemplary embodiment, the invention may be directed toward one or more computer systems capable of carrying out the functionality described herein. An example of a computer system 800 is shown in FIG. 8, depicting an exemplary embodiment of a block diagram of an exemplary computer system useful for implementing the present invention. Specifically, FIG. 8 illustrates an example computer 800, which in an exemplary embodiment may be, e.g., (but not limited to) a personal computer (PC) system running an operating system such as, e.g., (but not limited to) WINDOWS MOBILE™ for POCKET PC, or MICROSOFT® WINDOWS® NT/98/2000/XP/CE/, etc. available from MICROSOFT® Corporation of Redmond, Wash., U.S.A., SOLARIS® from SUN® Microsystems of Santa Clara, Calif., U.S.A., OS/2 from IBM® Corporation of Armonk, N.Y., U.S.A., Mac/OS from APPLE® Corporation of Cupertino, Calif., U.S.A., etc., or any of various versions of UNIX® (a trademark of the Open Group of San Francisco, Calif., USA) including, e.g., LINUX®, HPUX®, IBM AIX®, and SCO/UNIX®, etc. However, the invention may not be limited to these platforms. Instead, the invention may be implemented on any appropriate computer system running any appropriate operating system. In one exemplary embodiment, the present invention may be implemented on a computer system operating as discussed herein. An exemplary computer system, computer 800 is shown in FIG. 8. Other components of the invention, such as, e.g., (but not limited to) a computing device, a communications device, a telephone, a personal digital assistant (PDA), a personal computer (PC), a handheld PC, client workstations, thin clients, thick clients, proxy servers, network communication servers, remote access devices, client computers, server computers, routers, web servers, data, media, audio, video, telephony or streaming technology servers, etc., may also be implemented using a computer such as that shown in FIG. 8.

The computer system 800 may include one or more processors, such as, e.g., but not limited to, processor(s) 804. The processor(s) 804 may be connected to a communication infrastructure 806 (e.g., but not limited to, a communications bus, cross-over bar, or network, etc.). Various exemplary software embodiments may be described in terms of this exemplary computer system. After reading this description, it will become apparent to a person skilled in the relevant art(s) how to implement the invention using other computer systems and/or architectures.

Computer system 800 may include a display interface 802 that may forward, e.g., but not limited to, graphics, text, and other data, etc., from the communication infrastructure 806 (or from a frame buffer, etc., not shown) for display on the display unit 830.

The computer system 800 may also include, e.g., but may not be limited to, a main memory 808, random access memory (RAM), and a secondary memory 810, etc. The secondary memory 810 may include, for example, (but not limited to) a hard disk drive 812 and/or a removable storage drive 814, representing a floppy diskette drive, a magnetic tape drive, an optical disk drive, a compact disk drive CD-ROM, etc. The removable storage drive 814 may, e.g., but not limited to, read from and/or write to a removable storage unit 818 in a well known manner. Removable storage unit 818, also called a program storage device or a computer program product, may represent, e.g., but not limited to, a floppy disk, magnetic tape, optical disk, compact disk, etc. which may be read from and written to by removable storage drive 814. As will be appreciated, the removable storage unit 818 may include a computer usable storage medium having stored therein computer software and/or data.

In alternative exemplary embodiments, secondary memory 810 may include other similar devices for allowing computer programs or other instructions to be loaded into computer system 800. Such devices may include, for example, a removable storage unit 822 and an interface 820. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units 822 and interfaces 820, which may allow software and data to be transferred from the removable storage unit 822 to computer system 800.

Computer 800 may also include an input device such as, e.g., (but not limited to) a mouse or other pointing device such as a digitizer, and a keyboard or other data entry device (none of which are labeled).

Computer 800 may also include output devices, such as, e.g., (but not limited to) display 830, and display interface 802. Computer 800 may include input/output (I/O) devices such as, e.g., (but not limited to) communications interface 824, cable 828 and communications path 826, etc. These devices may include, e.g., but not limited to, a network interface card, and modems (neither are labeled). Communications interface 824 may allow software and data to be transferred between computer system 800 and external devices. Examples of communications interface 824 may include, e.g., but may not be limited to, a modem, a network interface (such as, e.g., an Ethernet card), a communications port, a Personal Computer Memory Card International Association (PCMCIA) slot and card, etc. Software and data transferred via communications interface 824 may be in the form of signals 828 which may be electronic, electromagnetic, optical or other signals capable of being received by communications interface 824. These signals 828 may be provided to communications interface 824 via, e.g., but not limited to, a communications path 826 (e.g., but not limited to, a channel). This channel 826 may carry signals 828, which may include, e.g., but not limited to, propagated signals, and may be implemented using, e.g., but not limited to, wire or cable, fiber optics, a telephone line, a cellular link, an radio frequency (RF) link and other communications channels, etc.

In this document, the terms "computer program medium" and "computer readable medium" may be used to generally refer to media such as, e.g., but not limited to removable storage drive 814, a hard disk installed in hard disk drive 812, and signals 828, etc. These computer program products may provide software to computer system 800. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

Embodiments of the invention may be implemented in one or a combination of hardware, firmware, and software. Embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

Computer programs (also called computer control logic), may include object oriented computer programs, and may be stored in main memory 808 and/or the secondary memory 810 and/or removable storage units 814, also called computer program products. Such computer programs, when executed, may enable the computer system 800 to perform the features of the present invention as discussed herein. In particular, the computer programs, when executed, may enable the processor 804 to provide a method to resolve conflicts during data synchronization according to an exemplary embodiment of the present invention. Accordingly, such computer programs may represent controllers of the computer system 800.

In another exemplary embodiment, the invention may be directed to a computer program product comprising a computer readable medium having control logic (computer software) stored therein. The control logic, when executed by the processor 804, may cause the processor 804 to perform the functions of the invention as described herein. In another exemplary embodiment where the invention may be implemented using software, the software may be stored in a computer program product and loaded into computer system 800 using, e.g., but not limited to, removable storage drive 814, hard drive 812 or communications interface 824, etc. The control logic (software), when executed by the processor 804, may cause the processor 804 to perform the functions of the invention as described herein. The computer software may run as a standalone software application program running atop an operating system, or may be integrated into the operating system.

In yet another embodiment, the invention may be implemented primarily in hardware using, for example, but not limited to, hardware components such as application specific integrated circuits (ASICs), or one or more state machines, etc. Implementation of the hardware state machine so as to perform the functions described herein will be apparent to persons skilled in the relevant art(s).

In another exemplary embodiment, the invention may be implemented primarily in firmware.

In yet another exemplary embodiment, the invention may be implemented using a combination of any of, e.g., but not limited to, hardware, firmware, and software, etc.

Exemplary embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

The exemplary embodiment of the present invention makes reference to wired, or wireless networks. Wired networks include any of a wide variety of well known means for coupling voice and data communications devices together. A brief discussion of various exemplary wireless network technologies that may be used to implement the embodiments of the present invention now are discussed. The examples are non-limited. Exemplary wireless network types may include, e.g., but not limited to, code division multiple access (CDMA), spread spectrum wireless, orthogonal frequency division multiplexing (OFDM), 1G, 2G, 3G wireless, Bluetooth, Infrared Data Association (IrDA), shared wireless access protocol (SWAP), "wireless fidelity" (Wi-Fi), WIMAX, and other IEEE standard 802.11-compliant wireless local area network (LAN), 802.16-compliant wide area network (WAN), and ultrawideband (UWB), etc.

Bluetooth is an emerging wireless technology promising to unify several wireless technologies for use in low power radio frequency (RF) networks.

IrDA is a standard method for devices to communicate using infrared light pulses, as promulgated by the Infrared Data Association from which the standard gets its name. Since IrDA devices use infrared light, they may depend on being in line of sight with each other.

The exemplary embodiments of the present invention may make reference to WLANs. Examples of a WLAN may include a shared wireless access protocol (SWAP) developed by Home radio frequency (HomeRF), and wireless fidelity (Wi-Fi), a derivative of IEEE 802.11, advocated by the wireless Ethernet compatibility alliance (WECA). The IEEE 802.11 wireless LAN standard refers to various technologies that adhere to one or more of various wireless LAN standards. An IEEE 802.11 compliant wireless LAN may comply with any of one or more of the various IEEE 802.11 wireless LAN standards including, e.g., but not limited to, wireless LANs compliant with IEEE std. 802.11a, b, d or g, such as, e.g., but not limited to, IEEE std. 802.11 a, b, d and g, (including, e.g., but not limited to IEEE 802.11g-2003, etc.), etc.

CONCLUSION

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A computer-implemented active portfolio performance attribution method for performing a portfolio performance attribution analysis across a plurality of time periods of an active portfolio, comprising:

determining, by at least one computer processor, weight and return measures between a plurality of assets of the active portfolio relative to a given portfolio benchmark, the active portfolio of said plurality of assets managed by at least one active portfolio manager based upon observed performance of said plurality of assets, wherein said weight and return measures of the active portfolio and said given portfolio benchmark are determined over the plurality of the time periods;

storing, by the at least one processor, said weight and return measures and a corresponding of the plurality of the time periods; and at least one of:

determining, by the at least one computer processor, at least one allocation measure (AM) of the plurality of assets, wherein the allocation measure (AM) comprises a mean of:

a first allocation (A-1) for a first exemplary period, and a second allocation (A-2) for a second exemplary period; and decomposing, by the at least one computer processor, the at least one allocation measure (AM) respectively into:

at least one static allocation (SA) measure, wherein the static allocation (SA) measure comprises a multiplicative product of (a difference of Wp-mean and Wb-mean), and Rb-mean, wherein said Wb-mean is a mean determined between a benchmark weight (Wb) of the first exemplary period, and a benchmark weight (Wb) of the second exemplary period;

wherein said Wp-mean is a mean determined between a portfolio weight (Wp) of the first exemplary period, and a portfolio weight (Wp) of the second exemplary period; and wherein said Rb-mean is a mean determined between a benchmark return (Rb) of the first exemplary period, and a benchmark return (Rb) of the second exemplary period; and at least one dynamic allocation (DA) measure wherein the dynamic allocation (DA) measure comprises the difference between the allocation measure (AM), and the static allocation (SA) measure; or determining, by the at least one computer processor, at least one volatility measure (VM) for the plurality of assets, wherein the volatility measure (VM) comprises a mean of:

a first volatility (V-1) for a first exemplary period, and a second volatility (V-2) for a second exemplary period; and decomposing, by the at least one computer processor, the at least one volatility measure (VM) into:

at least one static volatility (SV) measure, wherein the static volatility (SV) measure comprises a difference between a volatility of (a multiplicative product of Wp-mean and Rp), and a volatility of (a multiplicative product of Wb-mean and Rb),
wherein said Wb-mean is a mean determined between a benchmark weight (Wb) of the first exemplary period, and a benchmark weight (Wb) of the second exemplary period;
wherein said Wp-mean is a mean determined between a portfolio weight (Wp) of the first exemplary period, and a portfolio weight (Wp) of the second exemplary period; and
wherein said Rb is a benchmark return (Rb) and said Rp is a portfolio return (Rp); and
at least one dynamic volatility (DV) measure,
wherein the dynamic volatility (DV) measure comprises the difference between the volatility measure (VM), and the static volatility (SV) measure; and
attributing, by the at least one computer processor, performance of the active portfolio of the at least one active portfolio manager across said at least one of
said at least one static allocation (SA) measure, and
said at least one dynamic allocation (DA) measure of said at least one allocation measure (AM), or
said at least one static volatility (SV) measure, and
said at least one dynamic volatility (DV) measure of said at least one volatility measure (VM),
to obtain a portfolio performance attribution analysis result for the active portfolio of the at least one active portfolio manager, and
said attributing comprising at least one of:
attributing performance of a plurality of investment categories of the active portfolio selected by the at least one active portfolio manager, or
attributing investment skill of the at least one manager; and
providing, by the at least one computer processor, said portfolio performance attribution analysis result for the active portfolio of the at least one active portfolio manager to at least one of:
at least one storage device,
at least one investor, or
at least one output device.

2. The method according to claim 1, wherein determining the weight and return measures comprises:
establishing at least one benchmark weight (Wb) of the plurality of assets and at least one corresponding benchmark return (Rb) of the plurality of assets for at least one of a plurality of exemplary periods; and
determining at least one portfolio weight (Wp) of the plurality of assets and at least one corresponding portfolio return (Rp) of the plurality of assets for at least one of the exemplary periods.

3. The method according to claim 2, wherein the at least one allocation measure (AM) is based upon a plurality of allocations (A) each corresponding to at least one of the exemplary periods.

4. The method according to claim 3, wherein each said allocation (A) comprises the quantity (Wp−Wb) multiplied by Rb.

5. The method according to claim 4, further comprising at least one selection measure (SeM).

6. The method according to claim 5, wherein the selection measure (SeM) comprises the quantity (Rp−Rb) multiplied by Wp.

7. The method according to claim 4, wherein the weight and return measures are respectively determined for at least a first exemplary period and a second exemplary period.

8. An active portfolio performance attribution analysis system, comprising:
at least one computer processor adapted to determine weight and return measures between a plurality of assets of an active portfolio relative to a given portfolio benchmark, said active portfolio of said plurality of assets managed by at least one active portfolio manager based upon observed performance of said plurality of assets, wherein said weight and return measures of said active portfolio and said given portfolio benchmark are determined over a plurality of time periods;
at least one computer processor adapted to store, by the at least one processor, said weight and return measures and a corresponding of the plurality of the time periods; and
at least one of:
at least one computer processor adapted to determine at least one allocation measure (AM) of the plurality of assets for the plurality of time periods;
wherein the at least one allocation measure (AM) comprises a mean of:
a first allocation (A-1) for a first exemplary period, and
a second allocation (A-2) for a second exemplary period; and
at least one computer processor adapted to decompose the at least one allocation measure (AM) respectively into:
at least one static allocation (SA) measure,
wherein the static allocation (SA) measure comprises a multiplicative product of
(a difference between Wp-mean and Wb-mean), and Rb-mean,
wherein said Wb-mean is a mean determined between a benchmark weight (Wb) of the first exemplary period, and a benchmark weight (Wb) of the second exemplary period;
wherein said Wp-mean is a mean determined between a portfolio weight (Wp) of the first exemplary period, and a portfolio weight (Wp) of the second exemplary period; and
wherein said Rb-mean is a mean determined between a benchmark return (Rb) of the first exemplary period, and a benchmark return (Rb) of the second exemplary period; and
at least one dynamic allocation (DA) measure,
wherein the dynamic allocation (DA) measure comprises the difference between the allocation measure (AM), and the static allocation (SA) measure; or
at least one computer processor adapted to determine, by the at least one processor, at least one volatility measure (VM) for the plurality of assets
wherein the at least one volatility measure (VM) comprises a mean of:
a first volatility (V-1) for a first exemplary period, and a second volatility (V-2) for a second exemplary period; and
at least one computer processor adapted to decompose the at least one variance measure (VM) into:
at least one static volatility (SV) measure,
wherein the at least one static volatility (SV) measure comprises
a difference between
a volatility of (a multiplicative product of Wp-mean and Rp), and
a volatility of (a multiplicative product of Wb-mean and Rb), wherein said Wb-mean is a mean determined between a benchmark weight (Wb) of the first exemplary period, and a benchmark weight (Wb) of the second exemplary period;
wherein said Wp-mean is a mean determined between a portfolio weight (Wp) of the first exemplary period, and a portfolio weight (Wp) of the second exemplary period; and
wherein said Rb is a benchmark return (Rb) and said Rp is a portfolio return (Rp); and
at least one dynamic volatility (DV) measure,
wherein the at least one volatility measure (VM) comprises a mean of:
a first volatility (V-1) for a first exemplary period, and
a second volatility (V-2) for a second exemplary period; and
at least one computer processor adapted to attribute performance of the active portfolio of the at least one active portfolio manager across said at least one of:
said at least one static allocation (SA) measure, and
said at least one dynamic allocation (DA) measure of said at least one allocation measure (AM), or
said at least one static volatility (SV) measure, and
said at least one dynamic volatility (DV) measure of said at least one volatility measure (VM), to obtain a portfolio performance attribution analysis result for the active portfolio of the at least one active portfolio manager,
said at least one computer processor adapted to attribute performance comprising at least one of:
said at least one computer processor adapted to attribute performance of a plurality of investment categories of the active portfolio selected by the at least one active portfolio manager, or
said at least one computer processor adapted to attribute investment skill of the at least one manager; and
at least one computer processor adapted to provide, by the at least one processor, said portfolio performance attribution analysis result for the active portfolio of the at least one active portfolio manager to at least one of:
at least one storage device,
at least one investor, or
at least one output device.

9. The system according to claim 8, wherein the processor adapted to determine the weight and return measures comprises:
at least one computer processor adapted to establish at least one benchmark weight (Wb) of the plurality of assets and at least one corresponding benchmark return (Rb) of the plurality of assets for at least one of a plurality of exemplary periods; and
at least one computer processor adapted to determine at least one portfolio weight (Wp) of the plurality of assets and at least one corresponding portfolio return (Rp) of the plurality of assets for at least one of the exemplary periods.

10. The system according to claim 9, wherein the at least one allocation measure (AM) is based upon a plurality of allocations (A) each corresponding to at least one of the exemplary periods.

11. The system according to claim 10, wherein each said allocation (A) comprises the quantity (Wp−Wb) multiplied by Rb.

12. The system according to claim 11, further comprising at least one selection measure (SeM).

13. The system according to claim 12, wherein the selection measure (SeM) comprises the quantity (Rp−Rb) multiplied by Wp.

14. The system according to claim 11, wherein the at least one computer processor adapted to determine weight and return measures respectively comprises at least one computer processor adapted to determine weight and return measures for at least a first exemplary period and a second exemplary period.

15. A nontransitory machine-readable medium that provides instructions, which when executed by at least one computer processor of a computing platform, causes the computing platform to perform operations comprising a method for performing active portfolio performance attribution across a plurality of time periods of an active portfolio, the method comprising:
determining weight and return measures between a plurality of assets of the active portfolio relative to a given portfolio benchmark, the active portfolio of said plurality of assets managed by at least one active portfolio manager based upon the observed performance of said plurality of assets, wherein said weight and return measures of the active portfolio and said given portfolio benchmark are determined over the plurality of the time periods;
storing, by the at least one processor, said weight and return measures and a corresponding of the plurality of the time periods; and
at least one of:
determining at least one allocation measure (AM) of the plurality of assets,
wherein the allocation measure (AM) comprises a mean of:
a first allocation (A-1) for a first exemplary period, and
a second allocation (A-2) for a second exemplary period; and
decomposing the at least one allocation measure (AM) respectively into:
at least one static allocation (SA) measure,
wherein the static allocation (SA) measure comprises a multiplicative product of
(a difference of Wp-mean and Wb-mean), and Rb-mean,
wherein said Wb-mean is a mean determined between a benchmark weight (Wb) of the first exemplary period, and a benchmark weight (Wb) of the second exemplary period;
wherein said Wp-mean is a mean determined between a portfolio weight (Wp) of the first exemplary period, and a portfolio weight (Wp) of the second exemplary period; and wherein said Rb-mean is a mean determined between a benchmark return (Rb) of the first exemplary period, and a benchmark return (Rb) of the second exemplary period; and
at least one dynamic allocation (DA) measure,
wherein the dynamic allocation (DA) measure comprises the difference between the allocation measure (AM), and the static allocation (SA) measure; or
determining, by the at least one computer processor, at least one volatility measure (VM) for the plurality of assets, wherein the volatility measure (VM) comprises a mean of:
  a first volatility (V-1) for a first exemplary period, and
  a second volatility (V-2) for a second exemplary period; and
decomposing, by the at least one computer processor, the at least one volatility measure (VM) into:
at least one static volatility (SV) measure,
  wherein the static volatility (SV) measure comprises a difference between
    a volatility of (a multiplicative product of Wp-mean and Rp), and
    a volatility of (a multiplicative product of Wb-mean and Rb),
    wherein said Wb-mean is a mean determined between a benchmark weight (Wb) of the first exemplary period, and a benchmark weight (Wb) of the second exemplary period;
    wherein said Wp-mean is a mean determined between a portfolio weight (Wp) of the first exemplary period, and a portfolio weight (Wp) of the second exemplary period; and
    wherein said Rb is a benchmark return (Rb), and said Rp is a portfolio retuen (Rp); and
at least one dynamic volatility (DV) measure,
  wherein the dynamic volatility (DV) measure comprises the difference between the volatility measure (VM), and the static volatility (SV) measure; and
attributing, by the at least one computer processor, performance of the active portfolio of the at least one active portfolio manager across said at least one of:
said at least one static allocation (SA) measure, and
said at least one dynamic allocation (DA) measure of said at least one allocation measure (AM), or
said at least one static volatility (SV) measure, and
said at least one dynamic volatility (DV) measure of said at least one volatility measure (VM), to obtain a portfolio performance attribution analysis result for the active portfolio of the at least one active portfolio manager, and
said attributing comprising at least one of:
  attributing performance of a plurality of investment categories of the active portfolio selected by the at least one active portfolio manager, or
  attributing investment skill of the at least one manager; and
providing, by the at least one computer processor, said portfolio performance attribution analysis result for the active portfolio of the at least one active portfolio manager to at least one of:
at least one storage device,
at least one investor, or
at least one output device.

* * * * *